(12) United States Patent
Abe

(10) Patent No.: US 8,416,443 B2
(45) Date of Patent: Apr. 9, 2013

(54) APPARATUS, METHOD, AND SYSTEM OF PRINTING DOCUMENT FOR DISTRIBUTION, AND MEDIUM STORING PROGRAM OF PRINTING DOCUMENT FOR DISTRIBUTION

(75) Inventor: Yasushi Abe, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 722 days.

(21) Appl. No.: 12/629,406

(22) Filed: Dec. 2, 2009

(65) Prior Publication Data
US 2010/0134840 A1 Jun. 3, 2010

(30) Foreign Application Priority Data

Dec. 3, 2008 (JP) .................................. 2008-309032

(51) Int. Cl.
*G06F 3/12* (2006.01)
*G06K 15/00* (2006.01)
*H04N 1/40* (2006.01)
*H04N 1/04* (2006.01)
*G06K 9/00* (2006.01)
*G06K 19/06* (2006.01)

(52) U.S. Cl. ...................... 358/1.15; 358/1.16; 358/3.28; 358/474; 382/137; 235/494

(58) Field of Classification Search .......................... None
See application file for complete search history.

(56) References Cited

U.S. PATENT DOCUMENTS

| 7,433,075 | B2 * | 10/2008 | Tokunaga et al. ............... 358/1.9 |
|---|---|---|---|
| 7,440,137 | B2 * | 10/2008 | Abe et al. ...................... 358/2.1 |
| 7,590,289 | B2 * | 9/2009 | Ishii et al. ..................... 382/209 |
| 2003/0214684 | A1 * | 11/2003 | Kuboki ......................... 358/474 |
| 2006/0285160 | A1 * | 12/2006 | Tomita ......................... 358/1.16 |
| 2007/0029394 | A1 * | 2/2007 | Wicker et al. ................ 235/494 |
| 2007/0153303 | A1 * | 7/2007 | Abe et al. ...................... 358/1.8 |
| 2008/0320604 | A1 * | 12/2008 | Nakajima et al. ............... 726/28 |
| 2009/0244641 | A1 * | 10/2009 | Wu ............................... 358/3.28 |
| 2009/0245613 | A1 * | 10/2009 | Wu et al. ...................... 382/137 |

FOREIGN PATENT DOCUMENTS

| JP | 8-241309 | 9/1996 |
|---|---|---|
| JP | 2008-65550 | 3/2008 |

* cited by examiner

Primary Examiner — Satwant Singh
(74) Attorney, Agent, or Firm — Oblon, Spivak, McClelland, Maier & Neustadt, L.L.P.

(57) ABSTRACT

A plurality of sets of a printed document for distribution to a plurality of destinations is generated. For each one of the plurality of destinations, whether to perform conceal processing to document data is determined, and destination-specific print data is generated by performing conceal processing to the document data when it is determined that conceal processing is to be performed and by adding each one of the destination identification information identifying each one of the plurality of destinations to the document data.

19 Claims, 12 Drawing Sheets

| DESTINATION NO. | GROUP NAME | NAME | CONCEAL PROCESSING |
|---|---|---|---|
| 1 | A DEPARTMENT | TAROH RICOH | CONCEAL |
| 2 | B DEPARTMENT | HANAKO RICOH | NOT CONCEAL |
| 3 | C DEPARTMENT | ICHIRO RICOH | CONCEAL |
| ... | ... | ... | ... |

FIG. 3

DISTRIBUTED TO: ○○○Company

Sales Agreement

Area 1 ("Seller") and Area 2 ("Buyer) agrees to execute this agreement ("Agreement").

Section 1. (Establishment of Agreement)

Seller sells the software products ("Software") manufactured by Seller to Buyer according to the following terms and conditions, and Buyer accepts the Software according to the following terms and conditions.

Section 2. (Price)

The price of the Software is Area 3 yen.

Section 3. (Transfer of the Property)

The property right of the Software is deemed to be transferred from Seller to Buyer at the time when Buyer completes the payment of the price set forth by the Section 2.

DISTRIBUTED FROM: △△△

FIG. 7

| DESTINATION NO. | GROUP NAME | NAME | AUTHORIZATION LEVEL (1-3) |
|---|---|---|---|
| 1 | A DEPARTMENT | TAROH RICOH | 2 |
| 2 | B DEPARTMENT | HANAKO RICOH | 1 |
| 3 | C DEPARTMENT | ICHIRO RICOH | 3 |
| ... | ... | ... | ... |

FIG. 8

| AREA NO. | SECURITY LEVEL (1-3) |
|---|---|
| AREA 1 | 3 |
| AREA 2 | 2 |
| AREA 3 | 1 |
| ... | ... |

FIG. 9

| | | DISTRIBUTION AUTHORIZATION LEVEL | | | |
|---|---|---|---|---|---|
| | | NOT SET | 1 | 2 | 3 |
| AREA SECURITY LEVEL | 1 | CONCEAL | NOT CONCEAL | NOT CONCEAL | NOT CONCEAL |
| | 2 | CONCEAL | CONCEAL | NOT CONCEAL | NOT CONCEAL |
| | 3 | CONCEAL | CONCEAL | CONCEAL | NOT CONCEAL |

APPARATUS, METHOD, AND SYSTEM OF PRINTING DOCUMENT FOR DISTRIBUTION, AND MEDIUM STORING PROGRAM OF PRINTING DOCUMENT FOR DISTRIBUTION

CROSS-REFERENCE TO RELATED APPLICATIONS

This patent application is based on and claims priority under 35 U.S.C. §119 to Japanese Patent Application No. 2008-309032, filed on Dec. 3, 2008, in the Japanese Patent Office, the disclosure of which is hereby incorporated herein by reference.

FIELD OF THE INVENTION

The present invention generally relates to an apparatus, method, and system of printing a document for distribution and a recording medium storing a program of printing a document for distribution.

BACKGROUND

Even with the wide spread use of an electronic document, a printed document is still used especially for a meeting as the printed document is easier to read or write, or easier to carry, when compared to the electronic document. Such printed document to be distributed at the meeting may contain confidential information such that the printed document needs to be protected.

Various methods of preventing the leakage of confidential information from the printed document have been introduced. For example, the printed document having confidential information may be embedded with a specific pattern. When a user instructs an image forming apparatus to copy the printed document, the apparatus stops copying of the printed document if the specific pattern is detected. While copying of the printed document may be prevented, this technique is not capable of preventing the leakage of the printed document itself.

In order to prevent the leakage of the printed document itself, the printed document, which has been distributed at the meeting, may be managed, for example, by assigning a specific number to the printed document. Since the printed document is usually distributed to each one of a large number of meeting attendants, managing each printed document distributed to each attendant is cumbersome. Further, when the printed document includes a large number of pages, managing all pages for each printed document for each attendant becomes even more difficult.

Japanese Patent Application Publication No. 1-108-241309 describes a technique of adding distribution destination information to a document to be printed for distribution. While this may help the printed document to be managed more easily, it does not prevent the leakage of the printed document as it is difficult to mange the printed document itself once the printed document is distributed to each attendant.

Japanese Patent Application Publication No. 2008-65550 describes a technique of concealing confidential information contained in a document to be output. While this may conceal the confidential information contained in the document, conceal processing and output processing needs to be performed for each document and for each destination, one by one, such that preparation of such document may be time consuming especially when preparing a large number of documents for a large number of meeting attendants.

SUMMARY

In view of the above, one object of the present invention is to assist a user in preparing a printed document for distribution even when a plurality of sets of the printed document needs to be prepared for a plurality of distribution destinations. The document for distribution prepared for a specific destination contains only information that is authorized for the specific destination such that the leakage of the confidential information is suppressed. The document for distribution may be provided with distribution destination information such as the destination identification information indicating the specific destination to which the document is distributed such that management of the document is made easier.

Example embodiments of the present invention include an apparatus or system of generating a plurality of sets of a printed document for distribution to a plurality of destinations. The system or apparatus includes: a document data obtaining device to obtain document data for distribution, the document data including a plurality of conceal areas each of which is previously designated; a destination information obtaining device to obtain distribution destination information including a plurality of items of destination identification information respectively indicating the plurality of destinations to which the plurality of sets of the printed document will be respectively distributed; a conceal processing determiner device to determine, for each one of the plurality of destinations, whether to perform conceal processing to at least one of the plurality of conceal areas included in the document data to generate destination-specific conceal processing information indicating whether to perform conceal processing for each one of the plurality of destinations; a print data generating device to generate, for each one of the plurality of destinations, destination-specific print data from the document data, by 1) performing conceal processing to the at least one of the plurality of conceal areas included in the document data based on the destination-specific conceal processing information; and 2) adding each one of the destination identification information identifying each one of the plurality of destinations to the document data; and a printer to print a plurality of sets of the destination-specific print data generated by the print data generating device into the plurality of sets of the printed document to be respectively distributed to the plurality of destinations.

Example embodiments of the present invention include a method of generating a plurality of sets of a printed document for distribution to a plurality of destinations. The method includes: obtaining document data for distribution from a first memory, the document data including a plurality of conceal areas each of which is previously designated; obtaining distribution destination information including a plurality of items of destination identification information from a second memory, the plurality of items of destination identification information respectively indicating the plurality of destinations to which the plurality of sets of the printed document will be respectively distributed; determining, for each one of the plurality of destinations, whether to perform conceal processing to at least one of the plurality of conceal areas included in the document data to generate destination-specific conceal processing information indicating whether to perform conceal processing for each one of the plurality of destinations; generating, for each one of the plurality of destinations, destination-specific print data from the document data, by 1) performing conceal processing to the at least one of the plurality of conceal areas included in the document data based on the destination-specific conceal processing information; and 2) adding each one of the destination identification information identifying each one of the plurality of destinations to the document data; and printing using a printer a plurality of sets of the destination-specific print data into the plurality of sets of the printed document to be respectively distributed to the plurality of destinations.

In addition to the above-described example embodiments, the present invention may be practiced in various other ways, for example, as a recording medium storing a plurality of instructions which cause a processor to perform the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is an illustration for explaining an example document having one or more conceal areas;

FIG. 7 is a distribution destination table to be referred by the document printing apparatus of FIG. 6;

FIG. 8 is an area specific security level table indicating the security level assigned to each one of a plurality of conceal areas of the document;

FIG. 9 is a print determination table indicating whether to perform conceal processing to a specific conceal area of the document;

Figures 1, 2:
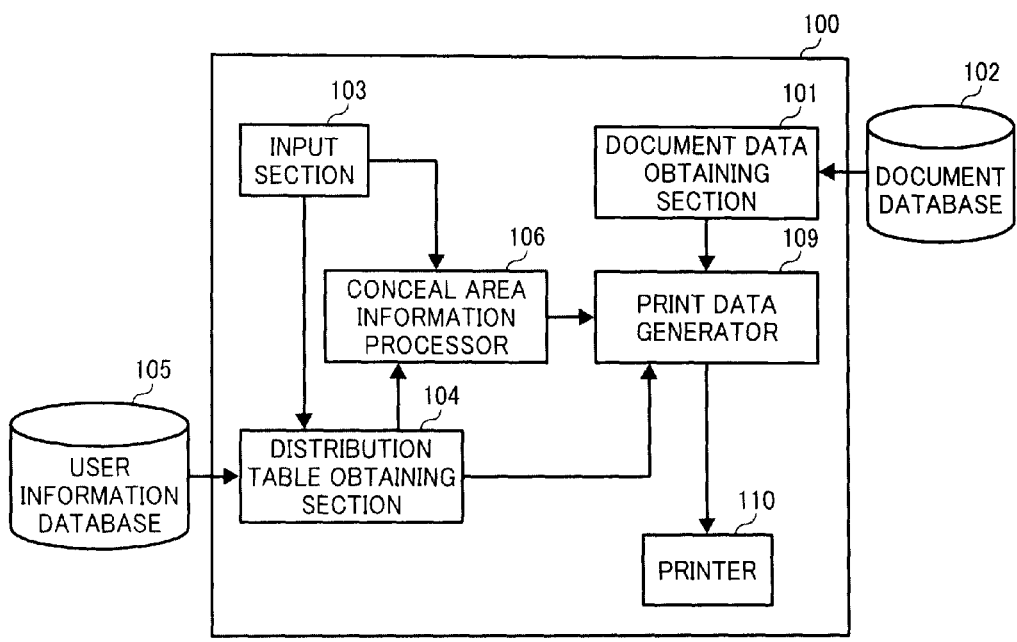
FIG. 1 is a schematic block diagram illustrating a functional structure of a document printing apparatus capable of printing a document for distribution, according to an example embodiment of the present invention.
FIG. 2 is a distribution destination table to be referred by the document printing apparatus of FIG. 1.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 5, an apparatus, system, and method of printing a document for distribution is explained according to an example embodiment of the present invention. In this example, it is assumed that a user prints a plurality of sets of the document for distribution at a specific meeting. Further, it is assumed that the document for distribution originally contains confidential information which is authorized for viewing by a restricted number of meeting attendants. In this example, information regarding the specific meeting such as the date and time of the meeting, the document for distribution at the meeting, the meeting attendants, the memorandums, etc., are all managed using the groupware software. Through the groupware software, the user can obtain information regarding the specific meeting such as information regarding the meeting attendants such as the name of each attendant or the group to which each attendant belongs.

FIG. 1 illustrates a schematic block diagram illustrating a functional structure of a document printing apparatus 100 capable of printing a document for distribution. The document printing apparatus 100 includes a document data obtaining section 101, a document database 102, an input section 103, a distribution table obtaining section 104, a user information database 105, a conceal area information processor 106, a print data generator 109, and a printer 110.

The document data obtaining section 101 obtains one or more documents that are stored in the document database 102. The document database 102 may be provided in a server system, which is connected to the document printing apparatus 100 through a network such as a local area network (LAN) or the Internet. The document database 102 may be managed by groupware software. The documents stored in the document database 102 may be generated using the groupware software or other type of application software.

The distribution table obtaining section 104 obtains a distribution destination table, which stores therein various distribution destination information regarding the meeting attendants who have been previously registered such as destination identification information identifying the meeting attendants, from the user information database 105. The user information database 105 may be managed by the groupware software. The distribution destination table, or its contents, may be obtained according to a user input made through the input section 103. The user input may include various information regarding the meetings that have been registered using the groupware software. The contents of the distribution destination table may be modified, for example, by adding the new items or changing the previously registered items.

FIG. 2 illustrates an example distribution destination table to be referred by the document printing apparatus 100. The distribution destination table of FIG. 2 is generated at the time of registering a meeting using the groupware software. The distribution destination table of FIG. 2 includes distribution destination information regarding the plurality of destinations to which the document is distributed including, for example, destination identification information identifying each of the plurality of destinations and conceal processing information indicating whether to perform conceal processing to a document to be distributed to each of the plurality of destinations. In this example, the distribution destination information includes information regarding the meeting attendants each of which are registered at the time of registering the meeting. The distribution destination table of FIG. 2 includes a plurality of fields including the distribution destination number ("DESTINATION NO."), the group name ("GROUP NAME"), the name ("NAME"), and conceal processing information indicating whether to perform conceal processing to the document to be distributed ("CONCEAL PROCESSING"). The distribution destination number is a unique number assigned to a specific meeting attendant. The group name is a name of the group to which the specific meeting attendant belongs. The name is a name of the specific meeting attendant. The conceal processing information indicates whether to perform conceal processing to the document to be distributed to the specific meeting attendant. The fields of the distribution destination table are not limited to this example illustrated in FIG. 2 such that any other field may be included. For example, in alternative to the conceal processing information, the distribution destination information of the distribution destination table of FIG. 2 may include information indicating a specific authorization level assigned to the specific meeting attendant.

The conceal area information processor 106 obtains the contents stored in the "CONCEAL PROCESSING" field of the distribution destination table of FIG. 2, which is obtained by the distribution table obtaining section 104 and may be referred to as the conceal processing information. The "CONCEAL PROCESSING" field may be set at the time of registering the meeting through the groupware software, for example, based on an authorization level previously assigned to each of the meeting attendants. Further, the "CONCEAL, PROCESSING" field may be modified according to a user input through the input section 103. The conceal area information processor 106 may further determine the type of a conceal pattern to be used for the conceal area, for example, through a user input made by the input section 103. For the descriptive purpose, information regarding the type of the conceal pattern may be referred to as conceal information.

The print data generator 109 generates print data from the document data obtained by the document data obtaining section 101, based on the distribution destination information such as the destination identification information obtained by the distribution table obtaining section 104 and the conceal information obtained by the conceal area information processor 106. For example, the document may be embedded with the destination identification information such as the group name of the attendant or the name of the attendant, using the destination identification information obtained from the distribution destination table of FIG. 2. Further, the document may have a conceal area to which concealing processing is applied according to the conceal information. In this example, the conceal information includes the type of the conceal pattern to be used for the conceal area. The printer 110 prints the print data generated by the print data generator 109 into a printed document.

FIG. 3 illustrates an example document for distribution, which includes a plurality of conceal areas. In this example, the conceal area of the document of FIG. 3 correspond to any one of the area X, with X being equal to 1 to 3. The document printing apparatus 100 may determine whether to conceal the contents displayed in the area X or not to conceal the contents displayed in the area X. The distribution destination information such as the destination identification information obtained by the distribution table obtaining section 104 may be added to a selected section, which may be referred to as the insertion section, of the document of FIG. 3. The insertion section corresponds to the header or footer section of the document. Alternatively, the insertion section may correspond to the area to which the character string, which indicates that the printed document is a copy of the original, is added. In this specific example illustrated in FIG. 3, the destination identification information is added to the header section of the document.

Figure 4:
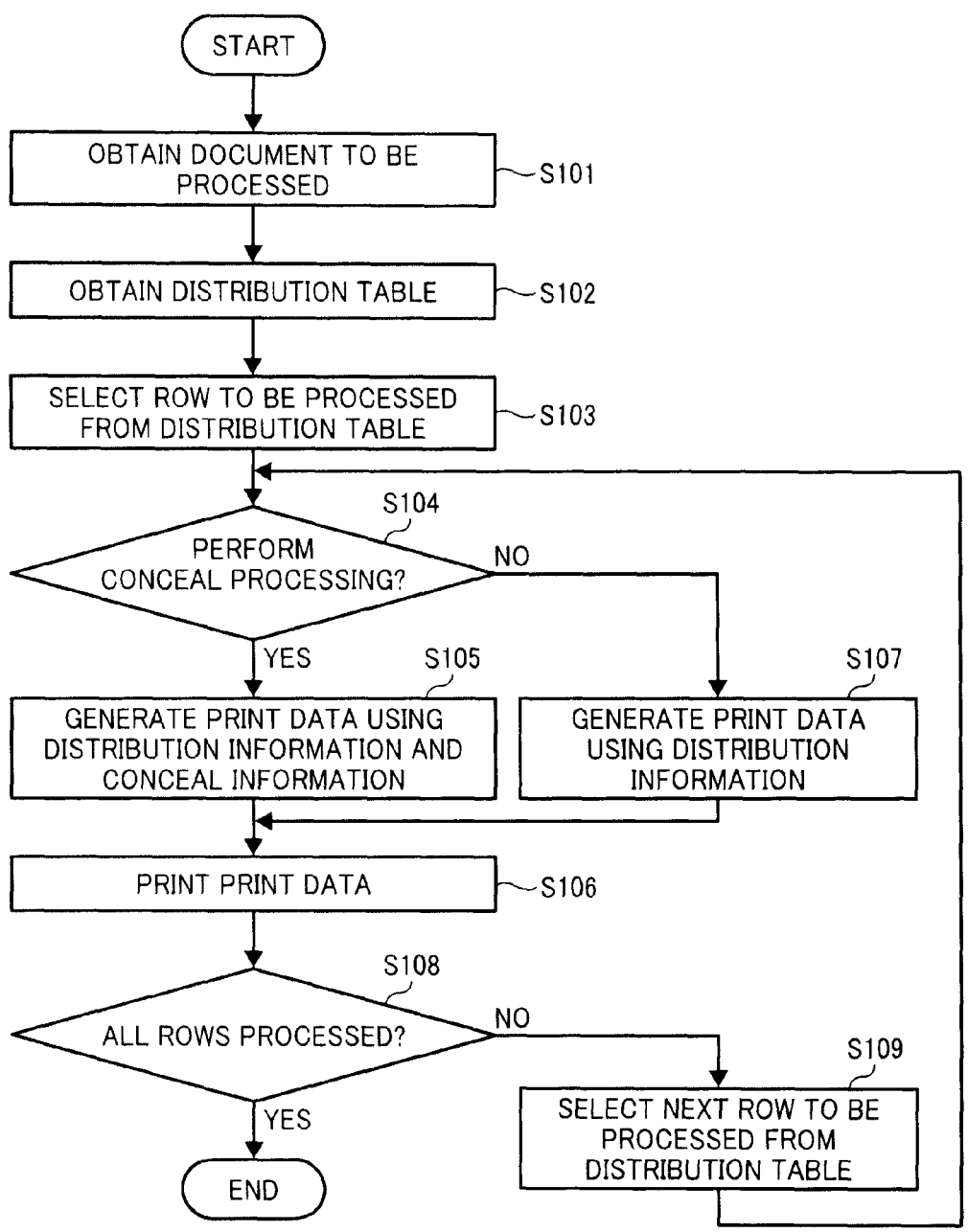
FIG. 4 is a flowchart illustrating operation of printing a document for distribution, performed by the document printing apparatus of FIG. 1, according to an example embodiment of the present invention.

Referring to FIG. 4, operation of printing a plurality of sets of a document for distribution to a plurality of destinations, performed by the document printing apparatus 100 of FIG. 1, is explained according to an example embodiment of the present invention.

At S101, the document printing apparatus 100 receives a user input through the input section 103, which selects the document to be printed. In this example, it is assumed that the user selects the document for distribution at a meeting specified by the user. The document data obtaining section 101 of the document printing apparatus 100 obtains the selected document from the document database 102.

At S102, the distribution table obtaining section 104 obtains the distribution destination table ("distribution table"), such as the table of FIG. 2, that corresponds to the meeting specified by the user. In this example, it is assumed that the distribution destination table is prepared at the time of registering the meeting.

At S103, the document printing apparatus 100 selects a first row of the distribution destination table for processing. More specifically, one of the plurality of destinations, i.e., the meeting attendants, is selected for processing.

At S104, the document printing apparatus 100 determines whether the "CONCEAL PROCESSING" field for the selected row is set to "CONCEAL". When it is determined that the "CONCEAL PROCESSING" field is set to "CON- CEAL" ("YES" at S104), the operation proceeds to S105. When it is determined that the "CONCEAL PROCESSING" field is set to "NOT CONCEAL" ("NO" at S104), the operation proceeds to S107.

At S105, the print data generator 109 of the document printing apparatus 100 generates the print data using the conceal information, and the distribution destination information ("distribution information"). The distribution destination information may include the destination identification information such as the group name or the name of the attendant.

At S107, the print data generator 109 of the document printing apparatus 100 generates the print data using the distribution destination information. The distribution destination information may include the destination identification information such as the group name or the name of the attendant. More specifically, the destination identification information is added to the print data.

At S106, the printer 110 prints the print data, which is generated at 5105 or S107, onto a recording sheet to generate a printed document to be distributed to the meeting attendant selected at S103.

At S108, the document printing apparatus 100 determines whether the row subjected for processing is the last row of the distribution destination table. When it is determined that the row subjected for processing is the last row ("YES" at S108), the operation ends. When it is determined that the row subjected for processing is not the last row ("NO" at S108), the operation proceeds to S109 to set a next row of the distribution destination table for processing to perform S104 to S108.

Figure 5A:
FIG. 5(a) is an illustration for explaining operation of replacing a conceal area with a solid image of a conceal pattern.

As described above, in this example, the selected area may be concealed when the "CONCEAL PROCESSING" field is set to "CONCEAL". In such case, the document printing apparatus 100 conceals the selected conceal area with a predetermined conceal pattern. Any one of patterns illustrated in FIGS. 5(a) to 5(c) may be used as the conceal pattern. FIG. 5(a) illustrates the conceal pattern, which conceals the contents of the conceal area by a black solid image. Alternatively, the contents of the conceal area may be concealed with the color which is the same color of the character present in the conceal area. Alternatively, the contents of the conceal area may be concealed with a multivalue image such as a halftone image. Further, the conceal area may be concealed with any shape of the image other than the rectangle shape illustrated in FIG. 5(a).

Figure 5B:
FIG. 5(b) is an illustration for explaining operation of replacing a conceal area with a blank image of a conceal pattern.

FIG. 5(b) illustrates the conceal pattern, which conceals the contents of the concealed area by a blank solid image. Alternatively, the contents, such as the character string, of the concealed area may be concealed with a space or may be deleted.

Figure 5C:
FIG. 5(c) is an illustration for explaining operation of replacing a conceal area with a character string of a conceal pattern.

FIG. 5(c) illustrates the conceal pattern, which conceals the contents, such as the character string, of the concealed area by the other contents such as the other character string. FIG. 5(c) illustrates the case in which the character string is concealed by the mark "***". Alternatively, any other mark, character, or numeral may be used. Further, in this example, the conceal pattern may be generated or selected at the time of inputting the initial setting of the document printing apparatus 100. Alternatively, the conceal pattern may be generated or selected during the operation of FIG. 4 such as before performing S105.

As described above referring to FIG. 4, when the print data generator 109 generates the print data while performing conceal processing, the print data generator 109 obtains the document to be processed from the document data obtaining section 101, and replaces the character string present in the conceal area of the obtained document with the conceal pattern. Further, the print data generator 109 inserts the distribution destination information such as the group name or the name of the attendant to the insertion section. The insertion section may be any one of the header section, footer section, or the selected area to which the character string indicating that the printed document is a copy document is embedded.

When the print data generator 109 generates the print data while not performing conceal processing, the print data generator 109 does not perform any conceal processing, but adds the distribution destination information to the insertion section.

As described above, in this example, the document printing apparatus 100 generates a plurality of sets of document, each document set including specific destination identification information unique to each attendant who will receive the document. By having the specific destination identification information printed on each document set, the document set may be easily managed even when each document set includes a large number of pages or when the number of meeting attendants is large. Further, the document printing apparatus 100 generates a plurality of sets of document, each document set including a specific conceal area individually set for each attendant who will receive the document. In this manner, the contents of each document set to be concealed may be individually set for a specific user, without requiring a user to prepare the plurality of sets of the document, one set by one set. More specifically, as described above, the document printing apparatus 100 automatically generates a plurality of sets of the document, one set by one set, once the user selects the document for distribution and the destinations. This facilitates the process of preparing a plurality of sets of the document for distribution to a plurality of destinations, while suppressing the leakage of confidential information contained in the document.

In the above-described example, the destination identification information to be added to the document is not limited to the group name or the name of the attendant as long as the attendant can be identified. For example, the identification number uniquely assigned to the attendant may be used.

Referring now to FIGS. 6 to 11, an apparatus, system, and method of printing a document for distribution is explained according to an example embodiment of the present invention. The example described referring to FIGS. 6 to 11 is substantially similar to the example described above referring to FIGS. 1 to 5. The example of FIGS. 6 to 11 further allows the apparatus to perform conceal processing to the document for each specific conceal area, with each specific conceal area being different among the plurality of destinations. In this example, whether to perform conceal processing for each specific conceal area is determined based on the combination of an area-specific security level that is previously assigned to each conceal area and a user-specific authorization level that is previously assigned to each distribution destination, or each meeting attendant.

Figure 6:
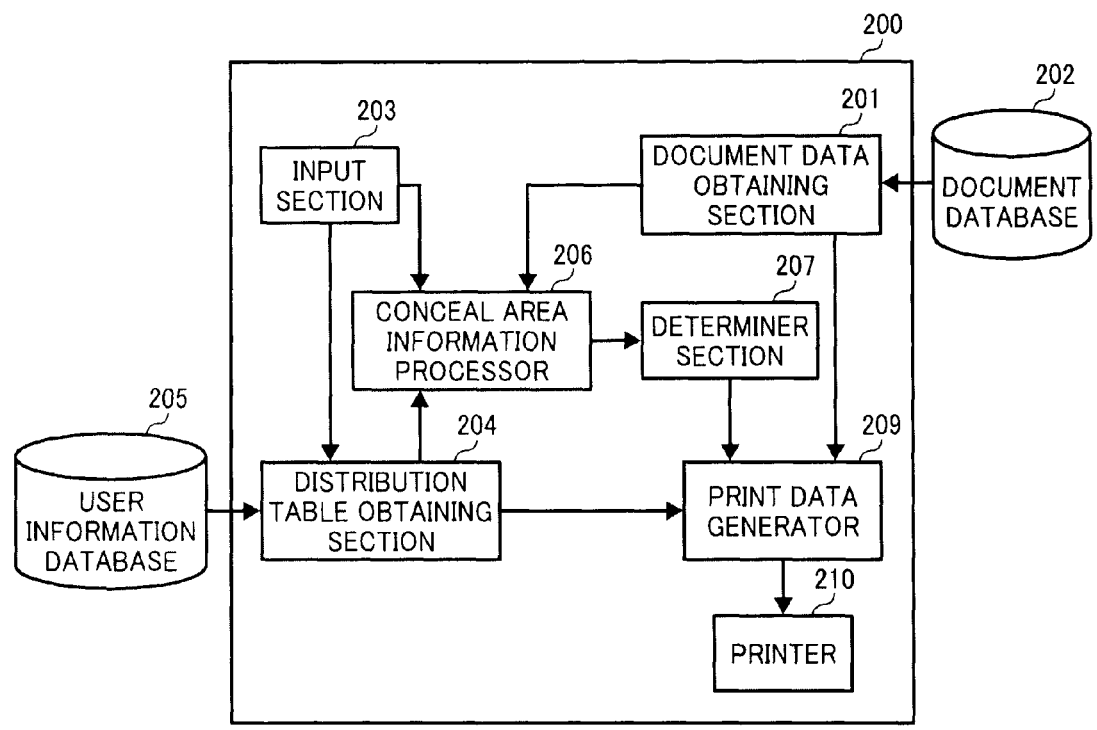
FIG. 6 is a schematic block diagram illustrating a functional structure of a document printing apparatus capable of printing a document for distribution, according to an example embodiment of the present invention.

FIG. 6 illustrates a schematic block diagram illustrating a functional structure of a document printing apparatus 200 capable of printing a document for distribution. As illustrated in FIG. 6, the document printing apparatus 200 includes a document data obtaining section 201, a document database 202, an input section 203, a distribution table obtaining section 204, a user information database 205, a conceal area information processor 206, a determiner section 207, a print data generator 209, and a printer section 210. The document data obtaining section 201, the document database 202, the print data generator 209, and the printer 210 are substantially similar in function to the document data obtaining section 101, the document database 102, the print data generator 109, and the printer 110, respectively.

The distribution table obtaining section 204 obtains a distribution destination table from the user information database 205, which stores various information regarding the attendants who are registered for a specific meeting. The distribution destination table, or its contents, may be obtained through the input section 103 from various information regarding the meetings that have been registered using the groupware software. The contents of the distribution table may be modified, for example, by adding the new items or changing the previously registered items.

FIG. 7 illustrates an example distribution destination table to be referred by the document printing apparatus 200. The distribution destination table of FIG. 7 stores the fields that are substantially similar to the fields of the distribution destination table of FIG. 2. The differences include the replacement of the "CONCEAL PROCESSING" field with the "AUTHORIZATION LEVEL." field. The fields of the distribution destination table are not limited to this example illustrated in FIG. 7 such that any other field may be added. For the descriptive purpose, information regarding the distribution destinations may be referred to as the distribution destination information.

The conceal area information processor 206 obtains the contents stored in the "AUTHORIZATION LEVEL" field of the distribution destination table of FIG. 7, which is obtained by the distribution table obtaining section 204. The "AUTHORIZATION LEVEL" field may be previously set by default by the groupware software, or set at the time of registering the meeting through the groupware software. Alternatively, the "AUTHORIZATION LEVEL" field may be modified according to a user input through the input section 103.

The determiner section 207 determines whether to perform conceal processing to the conceal area, using the distribution destination table of FIG. 7, an area security level of FIG. 8, and a print determination table of FIG. 9.

In this example, the distribution destination table of FIG. 7 includes three stages of authorization levels, with the level 1 corresponding to the low level, the level 2 corresponding to the medium level, and the level 3 corresponding to the high level. Further, in this example, the low authorization level is assigned to the attendant who has relatively low access to the confidential information, while the high authorization level is assigned to the attendant who has relatively high access to the confidential information.

The area security level table of FIG. 8 stores information regarding the security levels each of which are respectively assigned to each of the conceal areas that have been set in the document to be processed. Each of the conceal areas included in the document may be specified by the area number uniquely assigned, which may have a pointer to location information indicating the actual location within the document. In this example, the security levels have three stages, with the level 1 corresponding to the low level, the level 2 corresponding to the medium level, and the level 3 corresponding to the high level. Further, in this example, the low security level is assigned to the conceal area having information with a low level of confidentiality, while the high security level is assigned to the conceal area having information with a high level of confidentiality. The area security level table of FIG. 8 may be set at the time of generating the document to be processed, and stored in the document database 202 together with the document to be processed. The contents of the area security level table of FIG. 8 may be set or modified at any desired time as needed, for example, through the input section 203.

The print determination table of FIG. 9 includes information indicating whether conceal processing is to be performed or not for each one of the combinations of the security levels stored in the area security level table of FIG. 8 and the authorization levels stored in the distribution destination table of FIG. 7. The print determination table of FIG. 9 may be generated based on the distribution destination table of FIG. 7 and the area security level table of FIG. 8 to assist the document printing apparatus 200 to determine whether to perform conceal processing to each conceal area of the document for each destination. In this example of FIG. 9, as described above referring to FIG. 7, the authorization levels assigned to the destination have three stages, with the level 1 corresponding to the low level, the level 2 corresponding to the medium level, and the level 3 corresponding to the high level. As described above referring to FIG. 8, the area security levels assigned to each conceal area have three stages, with the level 1 corresponding to the low level, the level 2 corresponding to the medium level, and the level 3 corresponding to the high level. Based on the combination of the authorization level for a specific attendant and the security level for a specific conceal area, whether to perform conceal processing is determined. For example, when the authorization level for a specific attendant is the level 1 and the security level for a specific conceal area is the level 1, conceal processing is performed. Further, in this example, when no authorization level is assigned to a specific user, conceal processing is applied to all conceal areas included in the document.

In this manner, for each one of the plurality of destinations, whether to perform conceal processing to each conceal area included in the document is easily determined using the print determination table of FIG. 9. With this function, the document printing apparatus 200 is able to manage the contents of the document to be concealed for each distribution destination. For example, for each specific meeting attendant, the document printing apparatus 200 is able to generate the document for distribution at the meeting, while leaving the contents that are necessary for the meeting and concealing the contents that are not authorized to access.

Figure 10:
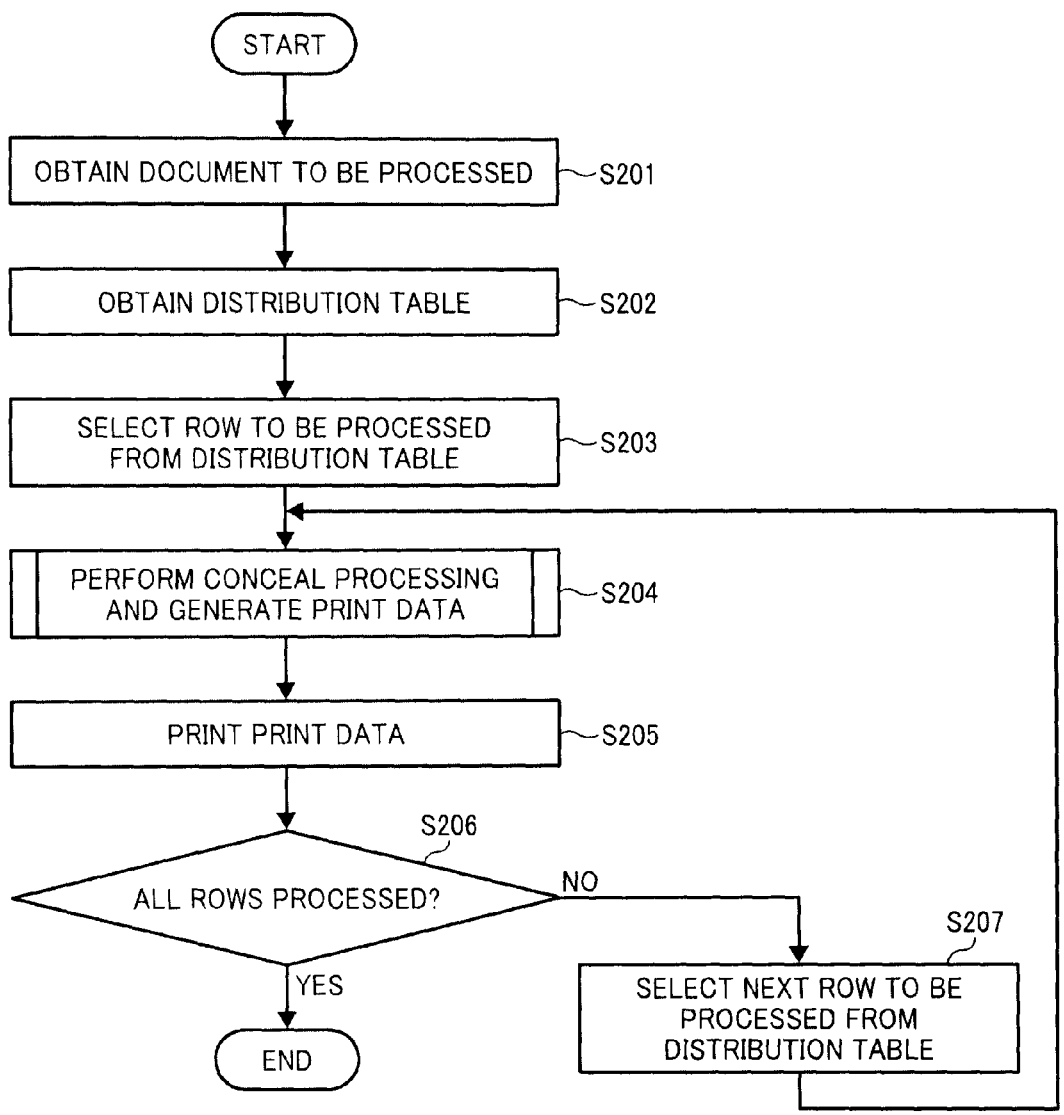
FIG. 10 is a flowchart illustrating operation of printing a document for distribution, performed by the document printing apparatus of FIG. 6, according to an example embodiment of the present invention.
Figure 11:
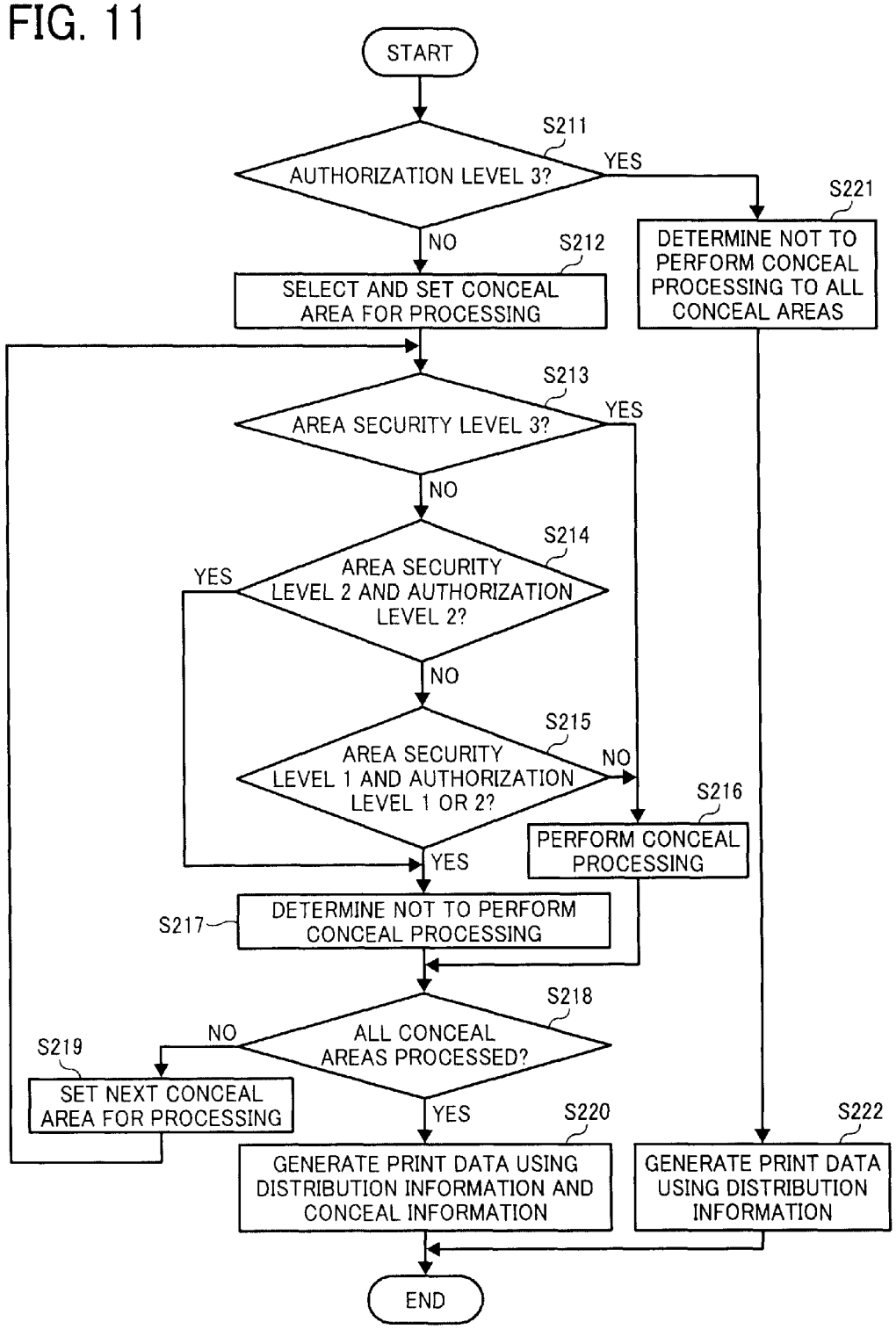
FIG. 11 is a flowchart illustrating operation of performing conceal processing and generating print data, respectively performed during the operation of FIG. 10.

Referring to FIGS. 10 and 11, operation of printing a plurality of sets of a document for distribution to a plurality of destinations, performed by the document printing apparatus 200 of FIG. 6, is explained according to an example embodiment of the present invention. FIG. 10 is a flowchart illustrating overall operation of printing the plurality of sets of the document for distribution. FIG. 11 is a flowchart illustrating detailed operation of performing conceal processing and generating print data.

At S201, the document printing apparatus 200 receives a user input through the input section 203, which selects the document to be printed. In this example, it is assumed that the user selects the document for distribution at a specific meeting specified by the user. The document data obtaining section 201 of the document printing apparatus 200 obtains the selected document from the document database 202.

At S202, the distribution table obtaining section 204 obtains the distribution destination table ("distribution table"), such as the table of FIG. 7, that corresponds to the meeting specified by the user. In this example, it is assumed that the distribution destination table is prepared at the time of registering the meeting.

At S203, the document printing apparatus 200 selects a first row of the distribution destination table for processing. More specifically, one of the plurality of destinations, i.e., the meeting attendants, is selected for processing.

At S204, the document printing apparatus performs conceal processing and generates print data as described below referring to FIG. 11.

At S205, the printer 210 of the document printing apparatus 200 prints the print data, which is generated at S204, onto a recording sheet to generate a printed document to be distributed to the meeting attendant selected at S203.

At S206, the document printing apparatus 200 determines whether the row subjected for processing is the last row of the distribution destination table. When it is determined that the row subjected for processing is the last row ("YES" at S206), the operation ends. When it is determined that the row subjected for processing is not the last row ("NO" at S206), the operation proceeds to S207 to set a next row of the distribution destination table for processing to perform S204 to S206.

The operation of performing conceal processing and generating print data illustrated in FIG. 11 is performed at S204 of FIG. 10 based on the print determination table of FIG. 9, for each row of the distribution destination table of FIG. 7 in a predetermined order.

At S211, the document printing apparatus 200 determines whether the "AUTHORIZATION LEVEL" field for the selected meeting attendant indicates the level 3. When it is determined that the "AUTHORIZATION LEVEL" field for the selected meeting attendant does not indicate the level 3 ("NO" at S211), the operation proceeds to S212.

At S212, the document printing apparatus 200 select a conceal area from a plurality of conceal areas of the document to be processed, and sets the selected conceal area for processing. In this example, the conceal areas are selected in the predetermined order from the area number 1 to the area number 3.

At S213, the document printing apparatus 200 refers to the print determination table of FIG. 9 to determine whether the security level of the selected conceal area subjected for processing is set to the level 3. When it is determined that the security level of the selected conceal area is set to the level 3 ("YES" at S213), the operation proceeds to S216 to perform conceal processing to the selected conceal area to conceal the contents included in the conceal area. When it is determined that the security level of the selected conceal area is not set to the level 3 ("NO" at S213), the operation proceeds to S214.

At S214, the document printing apparatus 200 refers to the print determination table of FIG. 9 to determine whether the security level of the selected conceal area is set to the level 2 and the authorization level of the specific meeting attendant is set to the level 2. When it is determined that the security level of the selected conceal area is set to the level 2 and the authorization level of the specific meeting attendant is set to the level 2 ("YES" at S214), the operation proceeds to S217 to determine not to perform any conceal processing to the selected conceal area. When it is determined that the security level of the selected conceal area is set to the level 2 and the authorization level of the specific meeting attendant is not set to the level 2 ("NO" at S214), the operation proceeds to S215.

At S215, the document printing apparatus 200 refers to the print determination table of FIG. 9 to determine whether the security level of the selected conceal area is set to the level 1 and the authorization level of the specific meeting attendant is set to the level 1 or the level 2. When it is determined that the security level of the selected conceal area is set to the level 1 and the authorization level of the specific meeting attendant is set to the level 1 or the level 2 ("YES" at S215), the operation proceeds to S217 to determine not to perform any conceal processing. When it is determined that the security level of the selected conceal area is not set to the level 1 nor the authorization level of the specific meeting attendant is not set to the level 1 or the level 2 ("NO" at S215), the operation proceeds to S216 to perform conceal processing to the selected conceal area.

At S218, the document printing apparatus 200 determines whether determination regarding whether to perform conceal processing is made for all conceal areas of the document subjected for processing. When it is determined that all conceal areas have been processed ("YES" at S218), the operation proceeds to S220. At S220, the document printing apparatus 200 generates the print data using the conceal information such as the type of the conceal pattern, and the distribution destination information such as the group name or the name of the specific meeting attendant.

When it is determined that not all conceal areas have been processed ("NO" at S218), the operation proceeds to S219 to select and set a next conceal area for processing to perform S213 to S218.

At S211, when it is determined that the authorization level field of the print determination table of FIG. 9 for the specific meeting attendant has been set to the level 3 ("YES" at S211), the operation proceeds to S221 to determine not to perform conceal processing for all conceal areas of the document subjected for processing.

At S222, the document printing apparatus 200 generates the print data using the distribution destination information such as the group name or the name of the attendant, and the operation ends to proceed to S205 of FIG. 10.

As described above, the document printing apparatus 200 determines whether to perform conceal processing to each one of the conceal areas of the document and for each one of the destinations, based on the combination of the area security level and the authorization level each combination specifying what contents in the document are allowed for each specific attendant to view. Accordingly, the document printing apparatus 200 is able to prepare a plurality of sets of the document for distribution to a plurality of destinations, while leaving the contents of the document that is necessary for the meeting and concealing the contents of the document from those who are not allowed to have access.

The above-described operation of FIG. 11 may be performed in various other ways. For example, the document printing apparatus 200 may refer to the distribution destination table of FIG. 7 and the area security level table of FIG. 8 to determine whether to perform conceal processing for each conceal area for each attendant.

Figure 12:
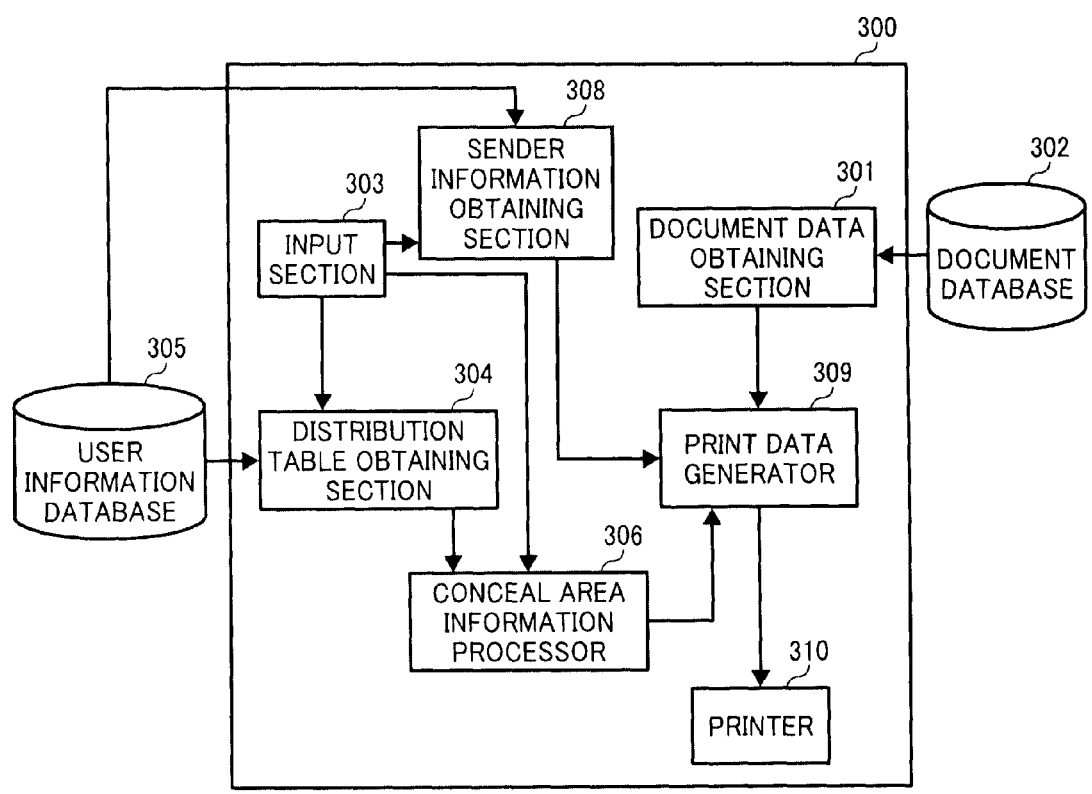
FIG. 12 is a schematic block diagram illustrating a functional structure of a document printing apparatus capable of printing a document for distribution, according to an example embodiment of the present invention.
Figure 13:
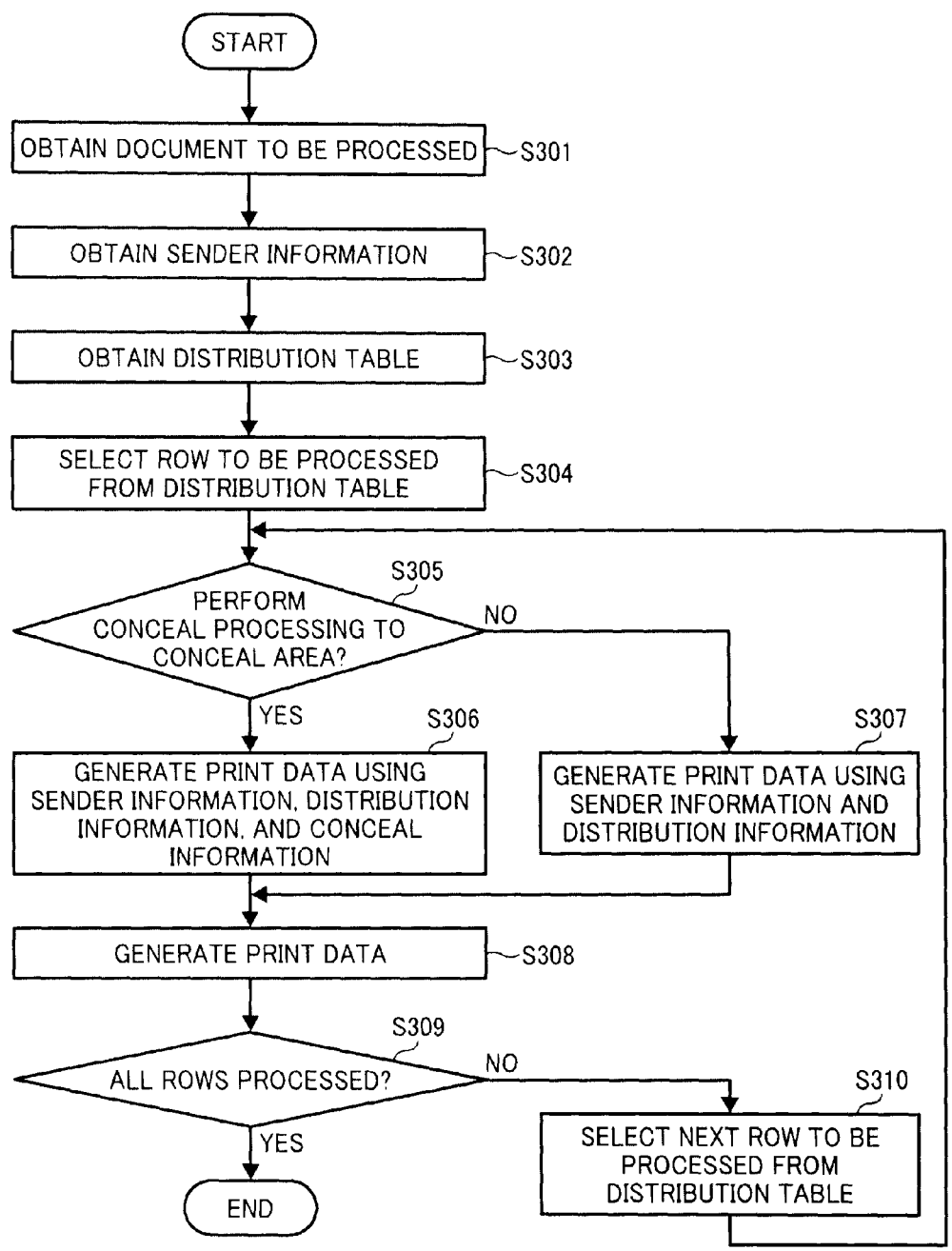
FIG. 13 is a flowchart illustrating operation of printing a document for distribution, performed by the document printing apparatus of FIG. 12, according to an example embodiment of the present invention.

Referring now to FIGS. 12 and 13, an apparatus, system, and method of printing a document for distribution is explained according to an example embodiment of the present invention. In this example, the document printing apparatus 300 of FIG. 12 prints the document such that information regarding the user who instructs the printing job is included in the printed document in addition to the distribution destination information regarding the destination to which the printed document is distributed. For the descriptive purpose, the user who instructs the printing job is referred to as a sender.

FIG. 12 illustrates a schematic block diagram illustrating a functional structure of the document printing apparatus 300 capable of printing a document for distribution. As illustrated in FIG. 12, the document printing apparatus 300 includes a document data obtaining section 301, a document database 302, an input section 303, a distribution table obtaining section 304, a user information database 305, a conceal area information processor 306, a sender information obtaining section 308, a print data generator 309, and a printer 310. The document data obtaining section 301, the document database 302, the print data generator 309, and the printer 310 are substantially similar in function to the document data obtaining section 101, the document database 102, the print data generator 109, and the printer 110, respectively.

The sender information obtaining section 308 obtains information regarding the sender, such as the identification information of the sender, from the user information database 305 as the sender information using, for example, login information input by the user. The sender information may be registered or modified at any desired time, for example, through the input section 303.

Referring to FIG. 12, operation of printing a plurality of sets of a document for distribution to a plurality of destinations, performed by the document printing apparatus 300, is explained according to an example embodiment of the present invention. The operation of FIG. 12 differs from the operation of FIG. 4 that the sender information is printed in addition to the distribution destination information.

At S301, the document printing apparatus 300 receives a user input through the input section 303, which selects the document to be printed. In this example, it is assumed that the user, who is the sender, selects the document for distribution at a meeting specified by the user. The document data obtaining section 101 of the document printing apparatus 300 obtains the selected document from the document database 102. For the descriptive purpose, in this example, the user and the sender may be used interchangeably.

At S302, the distribution table obtaining section 308 obtains the sender information such as the sender identification information of the sender from the user information database 305 that corresponds to the login information provided by the user. In this example, it is assumed that the sender is the person who instructs the document printing apparatus 300 to perform the printing job. The login information of the sender may be easily obtained when the sender logs onto the document printing apparatus 300 or the groupware software.

At S303, the distribution table obtaining section 304 obtains the distribution destination table ("distribution table"), such as the table of FIG. 2, that corresponds to the meeting specified by the user. In this example, it is assumed that the distribution destination table is prepared at the time of registering the meeting.

At S304, the document printing apparatus 300 selects a first row of the distribution table for processing. More specifically, one of the plurality of destinations, i.e., the meeting attendants, is selected for processing.

At S305, the document printing apparatus 300 determines whether the "CONCEAL PROCESSING" field for the selected row is set to "CONCEAL". When it is determined that the "CONCEAL PROCESSING" field is set to "CONCEAL" ("YES" at S305), the operation proceeds to S306. When it is determined that the "CONCEAL PROCESSING" field is set to "NOT CONCEAL" ("NO" at S305), the operation proceeds to S307.

At S306, the print data generator 309 of the document printing apparatus 300 generates the print data using the conceal information, the distribution destination information ("distribution information"), and the sender information obtained at S302. The distribution destination information may include the destination identification information such as the group name or the name of the attendant. The sender information may include the sender identification information such as the name of the sender. In this example, any one of the distribution destination information and the sender information may be inserted into the insertion area such as the header section or the footer section. The distribution destination information and the sender information may be inserted into the same area or into the areas different from each other.

For example, the distribution destination information and the sender information may be respectively inserted into the header section and the footer section, as illustrated in FIG. 3.

At S307, the print data generator 309 of the document printing apparatus 300 generates the print data using the sender information, and the distribution destination information ("distribution information") such as the group name or the name of the attendant.

At S308, the printer 310 prints the print data, which is generated at S306 or S307, onto a recording sheet to generate a printed document to be distributed to the meeting attendant selected at S304.

At S309, the document printing apparatus 300 determines whether the row subjected for processing is the last row of the distribution destination table. When it is determined that the row subjected for processing is the last row ("YES" at S309), the operation ends. When it is determined that the row subjected for processing is not the last row ("NO" at S309), the operation proceeds to S310 to set a next row of the distribution destination table for processing to perform S305 to S309.

As described above, in this example, the document printing apparatus 300 is capable of printing the document, to which the sender information is added in addition to the distribution destination information. Since the document includes the sender information and the distribution destination information, the user who will distribute the document or the user who will receive the document may be encouraged to treat the document as a confidential document. For instance, if the document is distributed to the third person, any one of the above users can be easily identified. This encourages the user to keep the contents of the document confidential.

In this example, the document printing apparatus 300 adds the sender information to the document for distribution. Additionally or alternatively, the document printing apparatus 300 may add information regarding a user who has generated the document. Further, any other information regarding the document such as the date of generating the document or printing the document, or any other information regarding the meeting at which the document will be distributed may be added.

Figure 14:
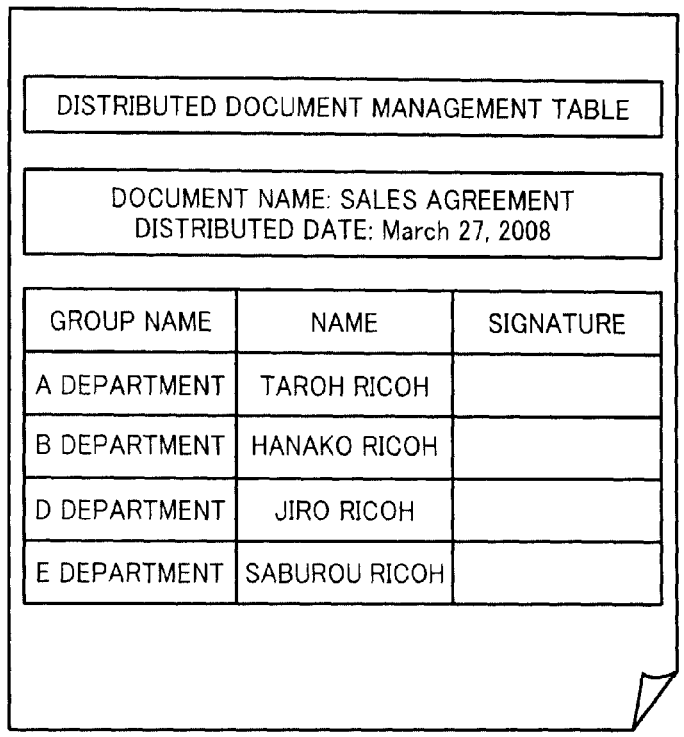
FIG. 14 is an illustration for explaining a document management table.
Figure 15:
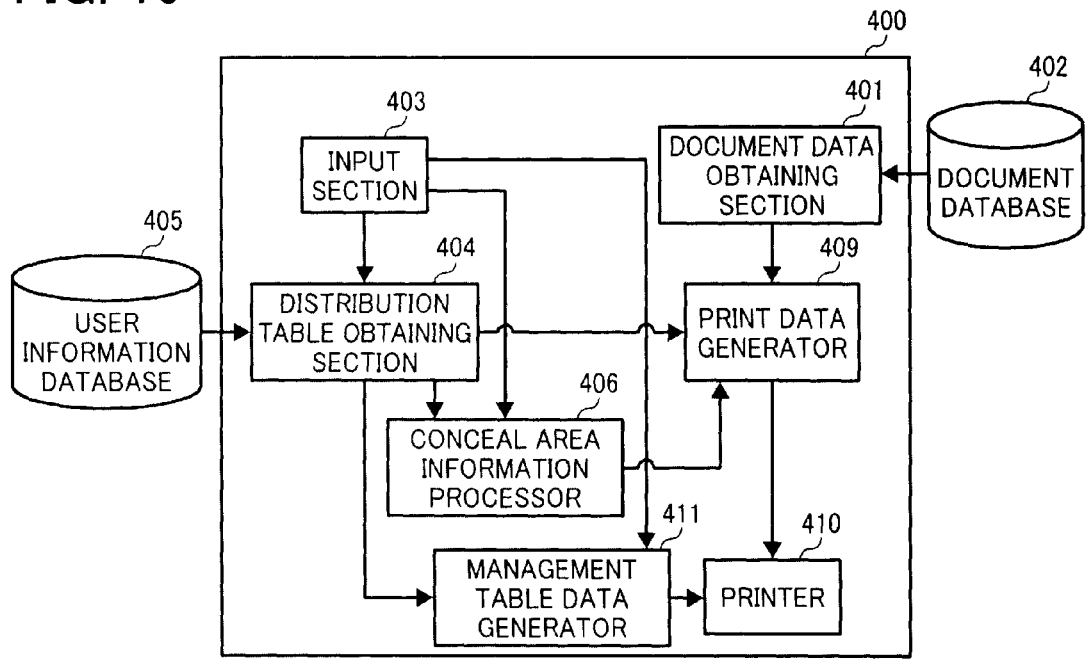
FIG. 15 is a schematic block diagram illustrating a functional structure of a document printing apparatus capable of printing a document for distribution, according to an example embodiment of the present invention.
Figure 16:
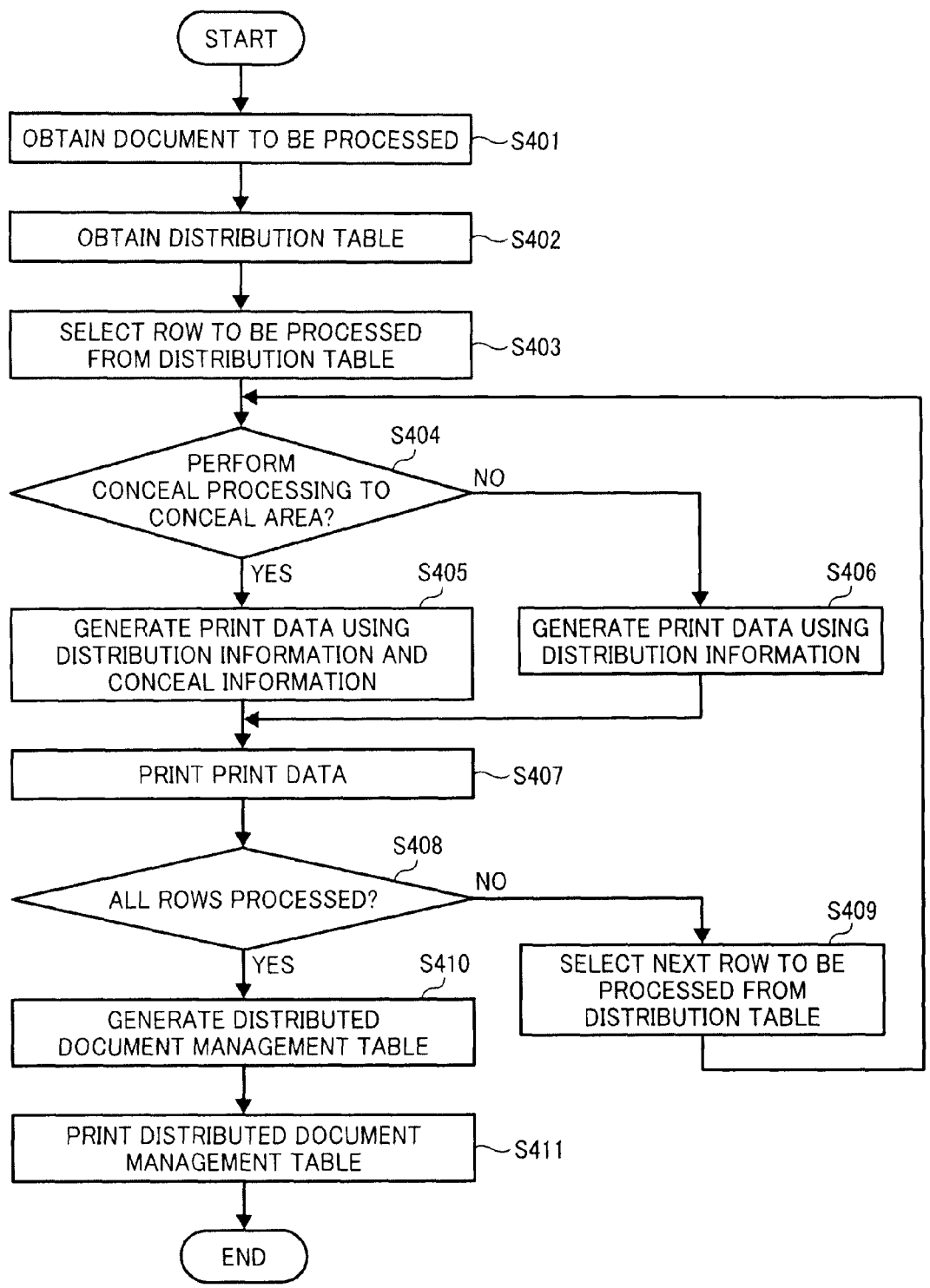
FIG. 16 is a flowchart illustrating operation of printing a document for distribution, performed by the document printing apparatus of FIG. 15, according to an example embodiment of the present invention.

Referring now to FIGS. 14 to 16, an apparatus, system, and method of printing a document for distribution is explained according to an example embodiment of the present invention. In this example, the document printing apparatus 400 of FIG. 15 additionally generates a list of documents generated by the document printing apparatus 400 upon receiving an instruction from the user. For example, such documents to be listed includes any document that is printed with the distribution destination information and the conceal area to which conceal processing is applied. Further, the document printing apparatus 400 is capable of generating a distributed document management table, which may be used for tracking the route of the distributed document.

As described above, by having the document printed with the distribution destination information such as the name of the attendant, the attendant who has the document feels more responsible for the distributed document. This suppresses the leakage of the contents of the document. However, when the contents of the document happens to be leaked to the third person, identifying the attendant from the distribution destination information printed on the distributed document does not solve the problem. For example, unless it is sure that the distributed document has been successfully handed out from the sender to the attendant, one cannot conclude that the distributed document has been leaked from the attendant. On the other hand, since the distribution destination information such as the name of the attendant is made visible, any person could alter such distribution destination information or generate the unauthorized document having the distribution destination information.

In view of the above, when printing the document for distribution, the document printing apparatus 400 prints the distributed document management table of FIG. 14 at the time of generating the printed document. Referring to FIG. 14, the distributed document management table includes a document name to be used for identifying the document for distribution such as the file name assigned to the document, the date of distribution, the group name and the name of the attendant, and the signature field. When the document is distributed from the sender to the attendant at the meeting, the sender may request each attendant to sign or seal a designated area (the "SIGNATURE" field) of the distributed document management table of FIG. 14. By having the attendant sign at the time of receiving the document, the sender, or any person, can recognize that the document has been safely received by the attendant.

FIG. 15 illustrates a schematic block diagram illustrating a functional structure of the document printing apparatus 400 capable of printing a document for distribution. The document printing apparatus 400 includes a document data obtaining section 401, a document database 402, an input section 403, a distribution table obtaining section 404, a user information database 405, a conceal area information processor 406, a print data generator 409, a printer 410, and a management table data generator 411. The document data obtaining section 401, the document database 402, the print data generator 409, and the printer 410 are substantially similar in function to the document data obtaining section 101, the document database 102, the print data generator 109, and the printer 110, respectively.

The management table data generator 411 may generate the distributed document management table of FIG. 14 based on the distribution destination table. In one example, the distribution destination table itself may be used as the distributed document management table. Alternatively, the contents of the distribution destination table may be modified or updated as needed, for example, through the input section 403 to generate the distributed document management table.

Referring to FIG. 16, operation of printing a plurality of sets of a document for distribution to a plurality of destinations, performed by the document printing apparatus 400 of FIG. 15, is explained according to an example embodiment of the present invention. In this example, it is assumed that the document printing apparatus 400 prints the distributed document management table in addition to the document for distribution.

At S401, the document printing apparatus 400 receives a user input through the input section 403, which selects the document to be printed. In this example, it is assumed that the user selects the document for distribution at a specific meeting specified by the user. The document data obtaining section 401 of the document printing apparatus 400 obtains the selected document from the document database 402.

At S402, the distribution table obtaining section 404 obtains the distribution destination table ("distribution table"), such as the table of FIG. 2, that corresponds to the meeting specified by the user. In this example, it is assumed that the distribution destination table is prepared at the time of registering the meeting.

At S403, the document printing apparatus 400 selects a first row of the distribution destination table for processing. More specifically, one of the plurality of destinations, i.e., the meeting attendants, is selected for processing.

At S404, the document printing apparatus 400 determines whether the "CONCEAL PROCESSING" field for the selected row is set to "CONCEAL". When it is determined that the "CONCEAL PROCESSING" field is set to "CONCEAL" ("YES" at S404), the operation proceeds to S405. When it is determined that the "CONCEAL PROCESSING" field is set to "NOT CONCEAL" ("NO" at S404), the operation proceeds to S406.

At S405, the print data generator 409 of the document printing apparatus 400 generates the print data using the conceal information such as the type of the conceal pattern, and the distribution destination information ("distribution information") such as the group name or the name of the attendant.

At S406, the print data generator 409 of the document printing apparatus 400 generates the print data using the distribution destination information such as the group name or the name of the attendant.

At S407, the printer 410 prints the print data, which is generated at S405 or S406, onto a recording sheet to generate a printed document to be distributed to the meeting attendant selected at S403.

At S408, the document printing apparatus 400 determines whether the row subjected for processing is the last row of the distribution destination table. When it is determined that the row subjected for processing is the last row ("YES" at S408), the operation proceeds to S410. When it is determined that the row subjected for processing is not the last row ("NO" at S408), the operation proceeds to S409 to set a next row of the distribution destination table for processing to perform S404 to S408.

At S410, the management table data generator 411 of the document printing apparatus 400 generates electronic data of the distributed document management table, such as the table illustrated in FIG. 14, based on the distribution destination table obtained at S402.

At S411, the printer 410 prints the distributed document management table onto a recording sheet to generate a printed distributed document management table, and the operation ends.

The operation of FIG. 16 may be performed in various other ways. For example, the document for distribution may be generated using any one of the methods other than the method described above that is similar in the method described referring to FIG. 4. For example, any one of the method described referring to FIGS. 10 and 11 and the method described referring to FIG. 13 may be performed to generate the document for distribution.

As described above referring to FIG. 16, the document printing apparatus 400 prints the distributed document management table at the time of generating and printing the document for distribution. The distributed document management table lists the plurality of sets of the document for distribution to the plurality of destinations. Further, the distributed document management table may be used to track the distribution route of the document. For example, the distributed document management table may be used to check whether the document has been safely received by the attendant by having the attendant sign a designated area of the distributed document management table at the time of receiving the document by the attendant. With the distributed document management table, information regarding who has the distributed document may be easily managed.

In any one of the above-described examples of generating the document for distribution, any one of the document printing apparatuses 100, 200, 300, and 400 needs to identify a specific conceal area to which conceal processing is to be applied in order to replace the conceal area with the conceal pattern. The example method of identifying the conceal area is explained below.

When the user creates the document, the user designates a specific area in the document to be subjected for conceal processing. Such specific area, which may be referred to as the conceal area, is the area having any confidential information that the user chooses not to have access by a certain user. Further, the user assigns the area security level to the conceal area that is designated. Various information regarding the conceal area, such as the specific location of the conceal area and the security level assigned to the conceal area, may be stored as attribute data to the document together with the document. Alternatively, such various information regarding the conceal area may be stored as a file separate from the file of the document as long as the correspondence between them is identifiable. For example, various information regarding the conceal area may be stored in the form of table such as the area security level table of FIG. 8.

More specifically, the document generating support application software, which is used to generate the document, may be provided with a function of specifying the conceal area and the area security level. Alternatively, propriety application software may be provided, in addition to the document generating support application software, to provide the function of specifying the conceal area and the area security level of the document that has been created using the document generating support application software.

In the example case of using the template document such as the sales agreement illustrated in FIG. 3 or the form document such as the money check or the invoice, the conceal area that the user desires to conceal can be made uniform among the users, for example, according to the company policy. In such case, the conceal area and the area security level may be previously set by default for each type of the template or form document, and stored as property data of the document or as a file separate from the file of the document. Such information regarding the conceal area and the area security level for the conceal area may be referred at the time of determining whether to perform conceal processing or printing.

Any one of the above-described apparatuses 100, 200, 300, and 400 of printing a document for distribution may be implemented using a computer system. For example, the computer may include a controller device such as a central processing unit (CPU), a storage device such as a read only memory (ROM) or a random access memory (RAM), an external storage device such as a hard disk drive (HDD) or a CD drive, a display device such as a liquid crystal display (LCD), and an input device such as a keyboard or a mouse.

Further, any one of the above-described methods of printing a document for distribution described above referring to FIGS. 4, 10-11, 13, and 16 may be performed by a document printing program, which may be stored in any desired computer readable recording medium, for example, as an installable file format or an executable file format. The examples of the computer readable recording medium include, but not limited to, a CD-ROM, flexible disk (FD), a CD-R, Digital Versatile Disk (DVD), etc.

Further, such document printing program may be stored onto a computer connected to a network of any desired type such as the Internet or a local area network. The document printing program may be downloaded through the network for distribution. Alternatively, the document printing program may be stored in a ROM, which may be integrated into any device, for distribution.

The above-described document printing program may cause any computer to have a module structure including any one of the above-described elements described above referring to FIGS. 1, 6, 12, and 15 such as the document data obtaining section, the input section, the distribution table obtaining section, the conceal area processor, the print data generator, and the printer. For example, the CPU of the computer may read the above-described document printing program from any recording medium onto a local memory to cause each section to be loaded onto a main memory to cause the computer to function as the document printing apparatus.

Figure 17:
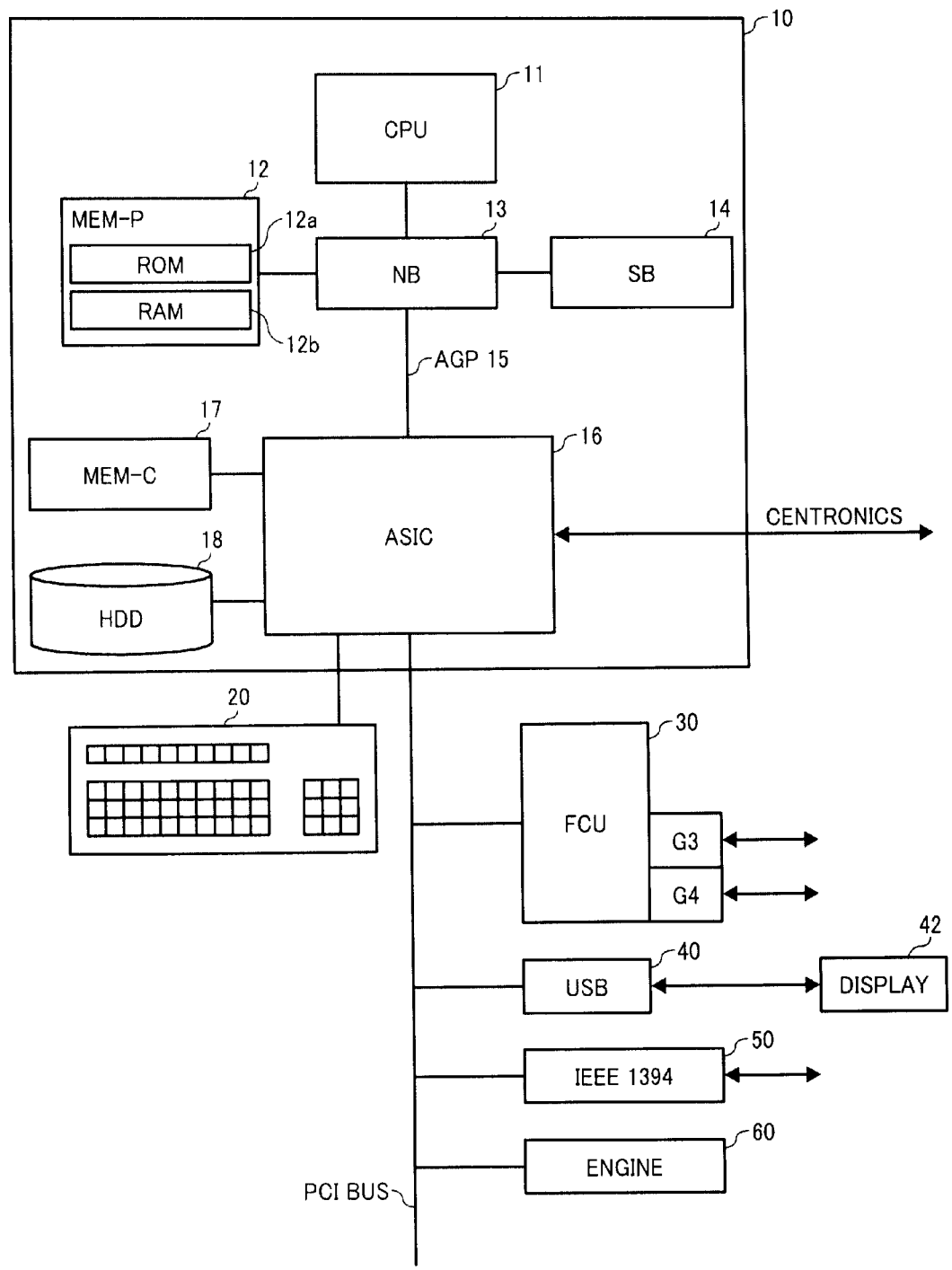
FIG. 17 is a schematic block diagram illustrating a hardware structure of any one of the document printing apparatuses of FIGS. 1, 6, 12, and 15.

Referring to FIG. 17, an example hardware structure of any one of the document printing apparatuses of 100, 200, 300, and 400 is explained. As illustrated in FIG. 17, the document printing apparatus includes a controller 10 and an engine 60, which are connected with each other through a peripheral component interconnect (PCI) bus. The controller 10 controls the entire operation of the document printing apparatus such as drawing operation, communication operation, or operation of receiving the input by an operation device. The engine 60, which may be implemented by a printer engine connectable to the PCI bus, may include a black/white plotter, one-drum type color printer, four-drum type color plotter, scanner, facsimile unit, etc. In addition to the plotter, the engine 60 may include an image processor such as error dispersion processor or gamma converter.

The controller 10 includes a CPU 11, a north bridge (NB) 13, a system memory (MEM-P) 12, a south bridge (SB) 14, a local memory (MEM-C) 17, an Application Specific Integrated Circuit (ASIC) 16, and a hard disk drive (HDD) 18. The NB 13 and the ASIC 16 are connected with each other through an Accelerated Graphics Port (AGP) bus 15. The MEM-P 12 further includes a ROM 12a and a RAM 12b.

The CPU 11 controls the entire operation of the document printing apparatus. The CPU 11 includes a chip set provided with the NB 13, MEM-P12, and SB 14. Through the chip set, the CPU 11 is connected to the other devices.

The NB 13 functions as a bridge for connecting the CPU 11, and the MEM-P12, SB 14, and AGP 15. The NB 13 includes a memory controller that controls reading from or writing to the MEM-P 12, PCI master, and AGP target.

The MEM-P 12 functions as a system memory, which may be used as a memory for storing programs or data, a memory for deploying programs or data, or a memory for drawing performed by the printer. The MEM-P 12 includes the ROM 12a and the RAM 12b. The ROM 12a is a read only memory, which may be used for storing the programs or data. The RAM 12b is a writable/readable memory, which may be used for deploying the programs or data or drawing.

The SB 14 is a bridge for connecting the NB 13, PCI device, and a peripheral device. The SB 14 is connected to the NB 13 through the PCI bus. The PCI bus may be connected to a network interface (I/F).

The ASIC 16 is an integrated circuit (IC) specially designed for image processing such that it is provided with a hardware for image processing. The ASIC 16 may function as a bridge for connecting the AGP 15, PCI bus, HDD 18, and MEM-C 17. The ASIC 16 includes a PCI target, AGP master, arbiter (ARB) having a central function of the ASIC 16, a memory controller for controlling the MEM-C17, a plurality of Direct Memory Access Controllers (DMACs) for causing rotation of image data using a hardware logic, and a PCI unit for transferring data through the PCI bus to the engine 60. The ASIC 16 is connected, through the PCI bus, to a Fax Control Unit (FCU) 30, a Universal Serial Bus (USB) 40, and the Institute of Electrical and Electronics Engineers (IEEE) 1394 interface 50. The operation device 20 is directly connected to the ASIC 16.

The MEM-C17 is a local memory, which may be used as a copy image buffer, a coding buffer, etc. The HDD 18 is a storage device for storing image data, programs, font data, or forms.

The AGP 15 is a bus interface for graphical accelerator card, which has been proposed to increase the speed for graphical processing. By directly accessing the MEM-P12 with high throughput, the graphical accelerator card can be processed with the increased speed.

The document printing program for causing the document printing apparatus to operate as described above may be previously stored in a memory such as a ROM and provided with the memory.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In one example, any one of the above-described methods of generating a document for distribution may be performed by a document printing system including an image forming apparatus such as a printer, a document server, a user information server, and a personal computer. Taking the document printing apparatus 100 of FIG. 1 as an example, the document server is provided with the document database 102. The image forming apparatus functions as the document printing apparatus 100 according to the document printing generating program installed therein. The user information server is provided with the user information database 105. The personal computer is a computer logged on by the user who instructs the image forming apparatus to perform operation of printing a plurality of sets of the document for distribution to a plurality of attendants, and functions as the input section 103. In such case, when the personal computer receives a user instruction from the user for printing a plurality of sets of a specific document for distribution to a plurality of attendants for a specific meeting, the personal computer requests the user information server to search for the distribution destination table having a list of attendants for the specific meeting, and provide the distribution destination table to the image forming apparatus. At the same time, the personal computer requests the document server to search the document database 102 for the specific document, and cause the document server to send the specific document to the image forming apparatus. The image forming apparatus generates a plurality of sets of the specific document to be respectively distributed to the plurality of attendants without requiring further information from the user. When printing is completed, the image forming apparatus may send a notice to the personal computer to request the user to take out the plurality of sets of the document. Alternatively, before printing the plurality of sets of the document, the image forming apparatus may ask the user at the personal computer whether to print the plurality of sets of the document. When a user instruction for printing is received, the image forming apparatus continues to printing the plurality of sets of the document. When a user instruction for printing is not received, for example, for a predetermined time period, the image forming apparatus stores the plurality of sets of the document data in a memory, and wait for a further instruction from the user at the personal computer. Alternatively, rather than printing the plurality of sets of the document, the image forming apparatus may send each document data to each attendant. Alternatively, rather than sending each document data to each attendant, the image forming apparatus may send the document data prepared for each group of the attendants to a leader of each group.

In another example, any one of the print generating apparatuses 100, 200, 300, and 400 may be implemented by more than one apparatus such as an image processing apparatus and an image forming apparatus. Taking the functional structure of FIG. 1 as an example, the printer 110 is provided in the image forming apparatus, while the other functions of the document printing apparatus 100 is provided in the image processing apparatus.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a method of generating a document for distribution, performed by an apparatus for printing the document for distribution, the method comprising: obtaining document data for distribution from a first database; obtaining destination information regarding a destination to which the document is distributed from a second database; determining whether to perform conceal processing to at least one conceal area which is previously specified in the document data for each destination, based on the destination information obtained by the step of obtaining destination information; generating print data for each destination, wherein the print data is generated by adding the destination information obtained by the step of obtaining destination information, and further performing conceal processing to the at least one conceal area when the step of determining whether to perform conceal processing determines that conceal processing is to be performed; and printing the print data generated by the step of generating print data.

In the above-described example, the step of determining whether to perform conceal processing includes step of specifying a conceal pattern to be replaced with the at least one conceal area, and the step of generating print data replaces the at least one conceal area with the specified conceal pattern when the step of determining whether to perform conceal processing determines that conceal processing is to be performed.

In the above-described example, the specified conceal pattern is a solid pattern having a specific color.

In the above-described example, the specified conceal pattern is a blank pattern having a background color.

In the above-described example, the specified conceal pattern is a character or a mark, which differs from information contained in the at least one conceal area.

In the above-described example, the destination information includes security level information indicating a security level for each one of combinations of authorization information assigned for each destination and a plurality of conceal areas specified in the document data. The step of determining whether to perform conceal processing determines whether to perform conceal processing for each one of the plurality of conceal areas based on the authorization information and the security level.

In the above-described example, the method of printing the document for distribution further includes: obtaining sender information indicating a sender of the document data. The step of generating print data adds the sender information obtained by the step of obtaining sender information to the document data to generate the print data.

In the above-described example, the method of printing the document for distribution further includes generating management table data which lists a plurality of destinations based on the destination information obtained by the step of obtaining destination information.

In another example, the present invention may reside in a document printing apparatus for printing a document for distribution, including: means for obtaining document data for distribution from a first database; means for obtaining destination information indicating a destination to which the document data is distributed from a second database; means for determining whether to perform conceal processing to at least one conceal area specified in the document data for each destination based on the destination information; and means for generating print data, wherein the print data is generated by adding the destination information to the document data, and further performing conceal processing to the at least one conceal area specified in the document data when the step of determining whether to perform conceal processing determines that conceal processing is to be performed.

In the above-described example, the means for determining whether to perform conceal processing includes means for specifying a conceal pattern to be replaced with the at least one conceal area. The means for generating print data replaces the at least one conceal area of the document data with the specified conceal pattern when the means for determining whether to perform conceal processing determines that conceal processing is to be performed.

In the above-described example, the specified conceal pattern is a solid pattern having a specific color.

In the above-described example, the specified conceal pattern is a blank pattern having a background color.

In the above-described example, the specified conceal pattern is a character or a mark, which differs from information contained in the at least one concealed area.

In the above-described example, the destination information includes security level information indicating a security level for each one of combinations of authorization information assigned for each destination and a plurality of conceal areas specified in the document data. The means for determining whether to perform conceal processing determines whether to perform conceal processing for each one of the plurality of conceal areas based on the authorization information and the security level.

In the above-described example, the apparatus of printing the document for distribution further includes: means for obtaining sender information indicating a sender of the document data. The means for generating print data adds the sender information obtained by the means for obtaining sender information to the document data to generate the print data.

In the above-described example, the apparatus of printing the document for distribution further includes means for generating management table data which lists a plurality of destinations based on the destination information obtained by the means for obtaining destination information.

According to one aspect of the present invention, a plurality of sets of the document is prepared for distribution to a plurality of destinations, with each document having the distribution destination information specifying a specific destination printed thereon and having specific information concealed from viewing by the specific destination. With this function, the document having the confidential information can be easily managed while suppressing the leakage of such document.

According to one aspect of the present invention, the document, which may be generated by any application, is set with a conceal area to which conceal processing is applied based on the authorization level of a specific destination to which the document is distributed and the area security level assigned to the conceal area. With this function, the document having the confidential information can be easily managed for each document and for each destination.

The invention claimed is:

1. A system of generating a plurality of sets of a printed document for distribution to a plurality of destinations, the system comprising:

a document data obtaining device configured to obtain document data for distribution, the document data including a plurality of conceal areas each of which is previously designated;

a destination information obtaining device configured to obtain distribution destination information including a plurality of items of destination identification information respectively indicating the plurality of destinations to which the plurality of sets of the printed document will be respectively distributed;

a conceal processing determiner device configured to determine, for each one of the plurality of destinations, whether to perform conceal processing to at least one of the plurality of conceal areas included in the document data to generate destination-specific conceal processing information indicating whether to perform conceal processing for each one of the plurality of destinations;

a print data generating device configured to generate, for each one of the plurality of destinations, destination-specific print data from the document data, by performing conceal processing to the at least one of the plurality of conceal areas included in the document data based on the destination-specific conceal processing information; and a printer configured to print a plurality of sets of the destination-specific print data generated by the print data generating device into the plurality of sets of the printed document to be respectively distributed to the plurality of destinations, wherein the plurality of destinations are each previously assigned with a specific authorization level, and the conceal processing determiner device determines whether to perform conceal processing to the at least one of the plurality of conceal areas included in the document data to be distributed to a specific destination based on the specific authorization level assigned to the specific destination to generate the destination-specific conceal processing information for each one of the plurality of destinations, and the plurality of conceal areas included in the document data are each previously assigned with a specific security level, and the conceal processing determiner device determines for each one of the plurality of destinations and for each one of the plurality of conceal areas whether to perform conceal processing to a specific conceal area included in the document data to be distributed to a specific destination based on the comparison between the specific authorization level assigned to the specific destination and the specific security level assigned to the specific conceal area to generate destination-area-specific conceal processing information for each one of the plurality of destinations, the destination-area-specific conceal processing information being used as the destination-specific conceal processing information.

2. The system of claim 1, wherein the destination-specific conceal processing information is stored in a table together with the destination identification information for each one of the plurality of destinations.

3. The system of claim 1, wherein the destination-area-specific conceal processing information is stored in a table to be referred by the print data generating device when generating the print data.

4. The system of claim 1, further comprising:
a sender information obtaining device configured to obtain sender identification information indicating at least one of a user who has generated the document data and a user who has instructed the system to generate the plurality of sets of the printed document, wherein the print data generating device adds the sender identification information to the document data.

5. The system of claim 4, further comprising:
a management table generating device configured to generate a management table including a list of the plurality of destinations based on the plurality of items of destination identification information, wherein the printer outputs the management table as a printed document.

6. The system of claim 1, wherein the conceal processing determiner device is further configured to specify a conceal pattern to replaced the at least one of the plurality of conceal areas included in the document data such that information contained in the at least one of the plurality of conceal areas is replaced by the conceal pattern when the print data is printed.

7. The system of claim 6, wherein the conceal pattern is selected from a solid pattern, a blank pattern, a character, and a mark.

8. The system of claim 1, wherein the system of generating the plurality of sets of the printed document for distribution is an image forming apparatus.

9. The system of claim 1, wherein the print data generating device adds the destination identification information to the document data.

10. A method of generating a plurality of sets of a printed document for distribution to a plurality of destinations, the method comprising:
obtaining document data for distribution from a first memory, the document data including a plurality of conceal areas each of which is previously designated;
obtaining distribution destination information including a plurality of items of destination identification information from a second memory, the plurality of items of destination identification information respectively indicating the plurality of destinations to which the plurality of sets of the printed document will be respectively distributed;
determining, for each one of the plurality of destinations, whether to perform conceal processing to at least one of the plurality of conceal areas included in the document data to generate destination-specific conceal processing information indicating whether to perform conceal processing for each one of the plurality of destinations;
generating, for each one of the plurality of destinations, destination-specific print data from the document data, by performing conceal processing to the at least one of the plurality of conceal areas included in the document data based on the destination-specific conceal processing information; and
printing using a printer a plurality of sets of the destination-specific print data into the plurality of sets of the printed document to be respectively distributed to the plurality of destinations, wherein
the plurality of destinations are each previously assigned with a specific authorization level, and the step of determining determines whether to perform conceal processing to the at least one of the plurality of conceal areas included in the document data to be distributed to a specific destination based on the specific authorization level assigned to the specific destination to generate the destination-specific conceal information for each one of the plurality of destinations, and
the plurality of conceal areas included in the document data are each previously assigned with a specific security level, and the step of determining determines for each one of the plurality of destinations and for each one of the plurality of conceal areas whether to perform conceal processing to a specific conceal area included in the document data to be distributed to a specific destination based on the comparison between the specific authorization level assigned to the specific destination and the specific security level assigned to the specific conceal area to generate destination-area-specific conceal processing information for each one of the plurality of destinations, the destination-area-specific conceal processing information being used as the destination-specific conceal processing information.

11. The method of claim 10, further comprising adding the destination identification information to the document data.

12. The method of claim 10, further comprising:
storing the destination-specific conceal processing information in a table together with the destination identification information for each one of the plurality of destinations.

13. The method of claim 10, further comprising:
storing the destination-area-specific conceal processing information in a table to be referred by the step of generating the print data.

14. The method of claim 10, further comprising:
specifying a conceal pattern to replace the at least one of the plurality of conceal areas included in the document data such that information contained in the at least one of the plurality of conceal areas is replaced by the conceal pattern when the print data is printed.

15. The method of claim 14, wherein the conceal pattern is selected from a solid pattern, a blank pattern, a character, and a mark.

16. A non-transitory recording medium storing a plurality of instructions which cause a computer to perform a method of printing a plurality of sets of a printed document for distribution to a plurality of destinations, the method comprising:
obtaining document data for distribution from a first memory, the document data including a plurality of conceal areas each of which is previously designated;
obtaining distribution destination information including a plurality of items of destination identification information respectively indicating the plurality of destinations to which the plurality of sets of the printed document will be respectively distributed;

determining, for each one of the plurality of destinations, whether to perform conceal processing to at least one of the plurality of conceal areas included in the document data to generate destination-specific conceal processing information indicating whether to perform conceal processing for each one of the plurality of destinations;

generating, for each one of the plurality of destinations, destination-specific print data from the document data, by performing conceal processing to the at least one of the plurality of conceal areas included in the document data based on the destination-specific conceal processing information; and printing a plurality of sets of the destination-specific print data into the plurality of sets of the printed document to be respectively distributed to the plurality of destinations, wherein the plurality of destinations are each previously assigned with a specific authorization level, and the step of determining determines whether to perform conceal processing to the at least one of the plurality of conceal areas included in the document data to be distributed to a specific destination based on the specific authorization level assigned to the specific destination to generate the destination-specific conceal information for each one of the plurality of destinations, and the plurality of conceal areas included in the document data are each previously assigned with a specific security level, and the step of determining determines for each one of the plurality of destinations and for each one of the plurality of conceal areas whether to perform conceal processing to a specific conceal area included in the document data to be distributed to a specific destination based on the comparison between the specific authorization level assigned to the specific destination and the specific security level assigned to the specific conceal area to generate destination-area-specific conceal processing information for each one of the plurality of destinations, the destination-area-specific conceal processing information being used as the destination-specific conceal processing information.

17. The non-transitory recording medium storing the plurality of instructions which cause the computer to perform the method of printing the plurality of sets of the printed document for distribution to the plurality of destinations of claim 16, the method further comprising adding the destination identification information to the document data.

18. The non-transitory recording medium storing the plurality of instructions which cause the computer to perform the method of printing the plurality of sets of the printed document for distribution to the plurality of destinations of claim 16, the method further comprising:

specifying a conceal pattern to replace the at least one of the plurality of conceal areas included in the document data such that information contained in the at least one of the plurality of conceal areas is replaced by the conceal pattern when the print data is printed.

19. The non-transitory recording medium storing the plurality of instructions which cause the computer to perform the method of printing the plurality of sets of the printed document for distribution to the plurality of destinations of claim 18, wherein the conceal pattern is selected from a solid pattern, a blank pattern, a character, and a mark.

* * * * *